Patented June 30, 1931

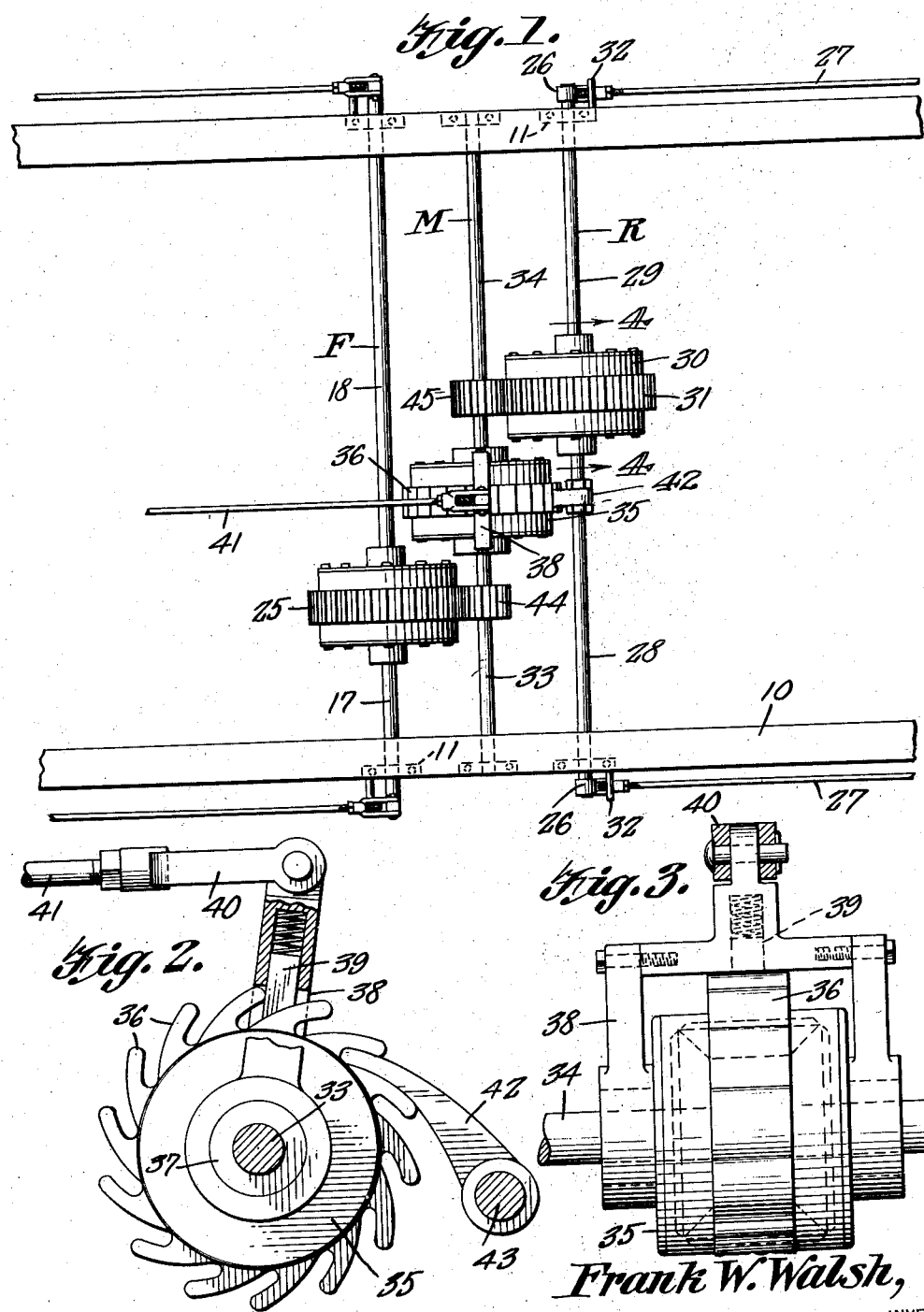

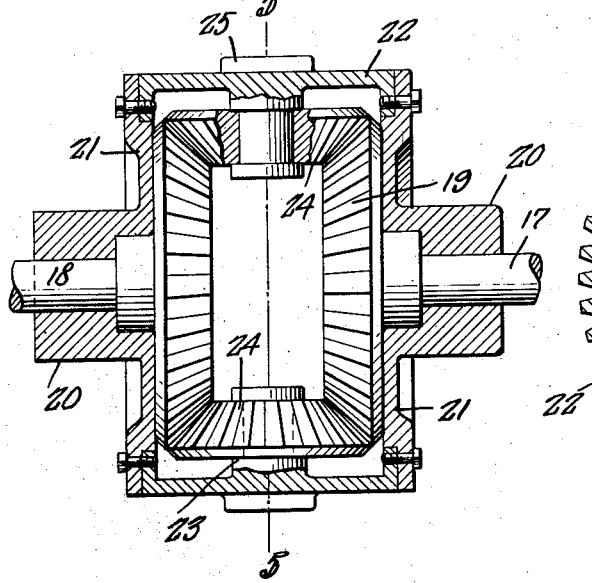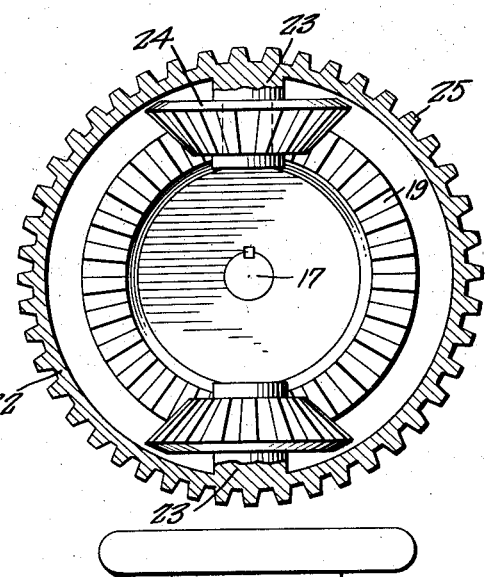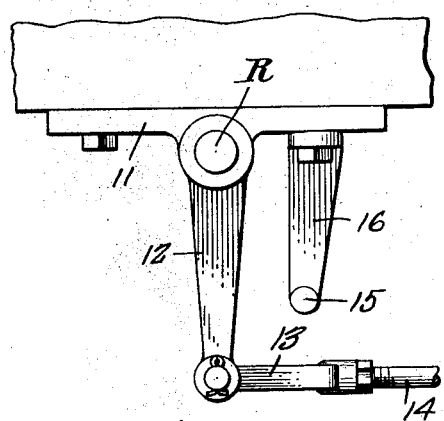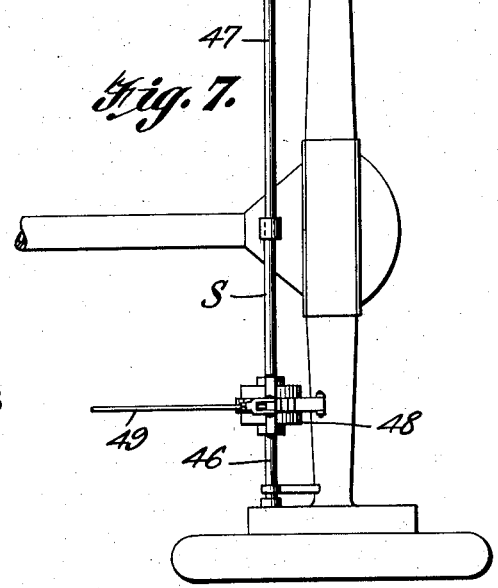

1,812,184

UNITED STATES PATENT OFFICE

FRANK W. WALSH, OF VANCOUVER, BRITISH COLUMBIA, CANADA

BRAKE EQUALIZER

Application filed March 1, 1929. Serial No. 343,824.

This invention relates to operating mechanisms for vehicle brakes, an object being to provide means for equalizing the application of the brakes when the latter are applied through the medium of a foot pedal, or other operating member.

Another object of the invention is the provision of means of the above character which may be used in connection with both four wheel and two wheel brakes to insure an equal application of all of the brakes.

Another object of the invention is the provision of means for automatically adjusting the brake mechanism through the application of the brakes, so that the latter will always be properly adjusted for use.

With the above and other objects in view, the invention further includes the following novel features and details of construction, to be hereinafter more fully described, illustrated in the accompanying drawings and pointed out in the appended claim.

In the drawings:—

Figure 1 is a plan view showing a fragmentary portion of the frame of an automobile with the brake equalizing mechanism in position.

Figure 2 is a fragmentary view partly in elevation and partly in section showing the automatic brake adjusting means.

Figure 3 is an enlarged elevation of the equalizing mechanism for the main rock shaft.

Figure 4 is an enlarged fragmentary section taken substantially on the line 4—4 of Figure 1.

Figure 5 is a section on the line 5—5 of Figure 4.

Figure 6 is an enlarged fragmentary elevation showing the mounting and stop for the brake rods.

Figure 7 is a fragmentary plan view illustrating the application of the invention for two wheel brakes.

Referring to the drawings in detail wherein like characters of reference denote corresponding parts, the invention is illustrated in Figure 1 arranged for use with four wheel brakes. In this figure the reference character F indicates a rock shaft which is mounted transversely of the vehicle frame 10 for connection with the brakes of the front wheels of a vehicle. For this purpose, the shaft F is mounted in suitable bearings 11 carried by the frame 10 and has secured to its opposite ends arms 12. These arms are connected by means of links 13 with the brake rods 14, whose opposite ends are suitably connected with the brakes (not shown). Pivotal movement of the shaft F in one direction is limited by means of stops 15 which are carried at the lower ends of arms 16 depending from the frame 10.

The shaft F is of sectional formation and comprises sections 17 and 18, whose adjacent ends have secured thereon beveled gears 19.

Mounted for rotation upon the shafts 17 are the hubs 20 of side plates 21 and these plates are connected by an annular member 22, which, together with the side plates 21, provides a housing which encloses the gears 19. The member 22 of this housing carries inwardly extending studs 23 upon which are rotatably mounted gears 24 which engage the gears 19. The annular member 22 has extending circumferentially therearound gear teeth 25.

The mechanism just described provides a differential gearing which connects the adjacent ends of the sections 17 and 18 of the shaft 10, so that these shaft sections may move relatively for a purpose to be presently understood.

Extending transversely of the frame 10 is a shaft R which is mounted in suitable bearings carried by the frame 10. These bearings are similar to the bearings 11 just described and the shaft R has secured upon its outer ends arms 26 which are similar to the arms 12. These arms 26 like the arms 12 are secured to brake rods 27 and these rods are adapted for connnection with the brakes of the rear wheels of the automobile.

The shaft R is also of sectional formation and includes sections 28 and 29 whose adjacent ends are connected by gearing similar to the gearing just described with the gearing arranged within a housing 30 which is also similar to the housing previously described. The shaft sections 28 and 29 are therefore connected by differential gearing and the housing of this gearing carries circumferentially spaced teeth 31. A stop 32 similar to the stop 15 is provided for the arms 26.

The shafts F and R are spaced apart and mounted in suitable bearings carried by the frame is a main shaft M. The shaft M is likewise formed of sections indicated at 33 and 34 and these sections are connected by a differential mechanism 35 which is similar to the differential mechanism described.

The housing of the differential mechanism 35 carries circumferentially spaced ratchet teeth 36 and mounted upon the hub 37 of the side plates of this housing is a yoke 38. The yoke is freely rotatable upon the hubs 37 and carries a spring influenced pawl 39 which engages the teeth 36. The yoke 38 is pivotally secured to a link 40 for connection with one end of a pull rod 41 whose opposite end is adapted for connection with a brake pedal or other operating member. The teeth 36 is also engaged by a take-up pawl 42 which is pivotally mounted as shown at 43. The shaft M has mounted thereon pinions 44 and 45 which engage respectively the gears 25 and 31.

From the foregoing description and accompanying drawings it will be seen that a pull upon the rod 41 will, through the dog 39 and the teeth 36, rotate the housing of the differential mechanism 35 of the main shaft. Rotation of this shaft will impart rotary movement to the shafts F and R through the pinions 34 and the gears 25 and 31 of their respective differential mechanisms. An equal application of all of the brakes will be thus effected. In the event that too great a movement of the rod 41 is necessary to operate the brakes, the pawl 42 will take up one or more of the teeth 36 when the mechanism is operated so that when the brake pedal or other operating members is released and the pawl 39 reaches its neutral position sufficient take up adjustment will have been effected and the brakes will have been automatically tightened.

The mechanism is equally well adapted for use with two wheel brakes as shown in Figure 7 of the drawings wherein the brake shaft S is formed of sections 46 and 47 whose outer ends are connected with the brake. The adjacent ends of the shaft sections are connected by differential mechanism 48 which is similar to the mechanism of the main shaft M and like this mechanism has connection with a pull rod 49. This rod is connected with a ratchet mechanism such as illustrated in Figure 2 of the drawings so that a pull upon the rod will operate the brakes and provide for an automatic take up to tighten the brakes when necessary.

The invention is susceptible of various changes in its form, proportions and minor details of construction and the right is herein reserved to make such changes as properly fall within the scope of the appended claim.

What I claim is:

In a brake equalizing mechanism, a pair of spaced parallel rock shafts adapted to have their outer ends connected with the brakes, each shaft including alined sections, differential mechanism geared to the adjacent ends of the sections of each shaft, and including a housing receiving said sections, a gear arranged exteriorly of each housing, a main operating rock shaft arranged between the first mentioned shafts, relatively small gears carried by the main shaft and meshing with the gears of said housing, said main shaft including alined sections, differential mechanism connecting the adjacent ends of said sections and including a housing receiving said sections, ratchet teeth arranged exteriorly of the latter mentioned housing, a yoke supported by said sections and straddling said housing, and including a centrally located depending tubular portion, a spring pressed pawl slidable in said portion and engageable with the ratchet teeth and an operating rod connected with the yoke for operating the latter at a remote point for the purpose specified.

In testimony whereof I affix my signature.

FRANK W. WALSH.